United States Patent Office 2,978,373
Patented Apr. 4, 1961

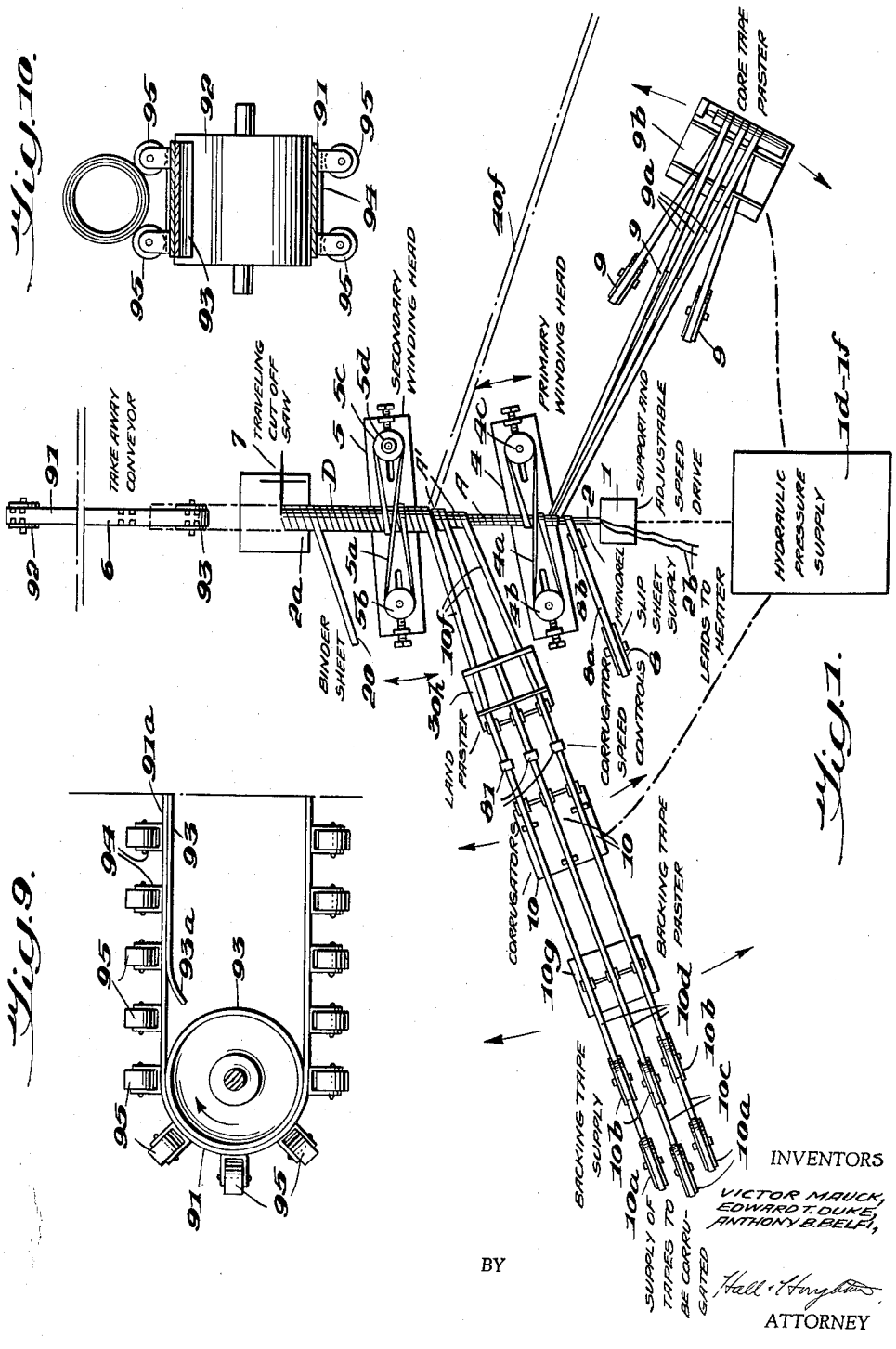

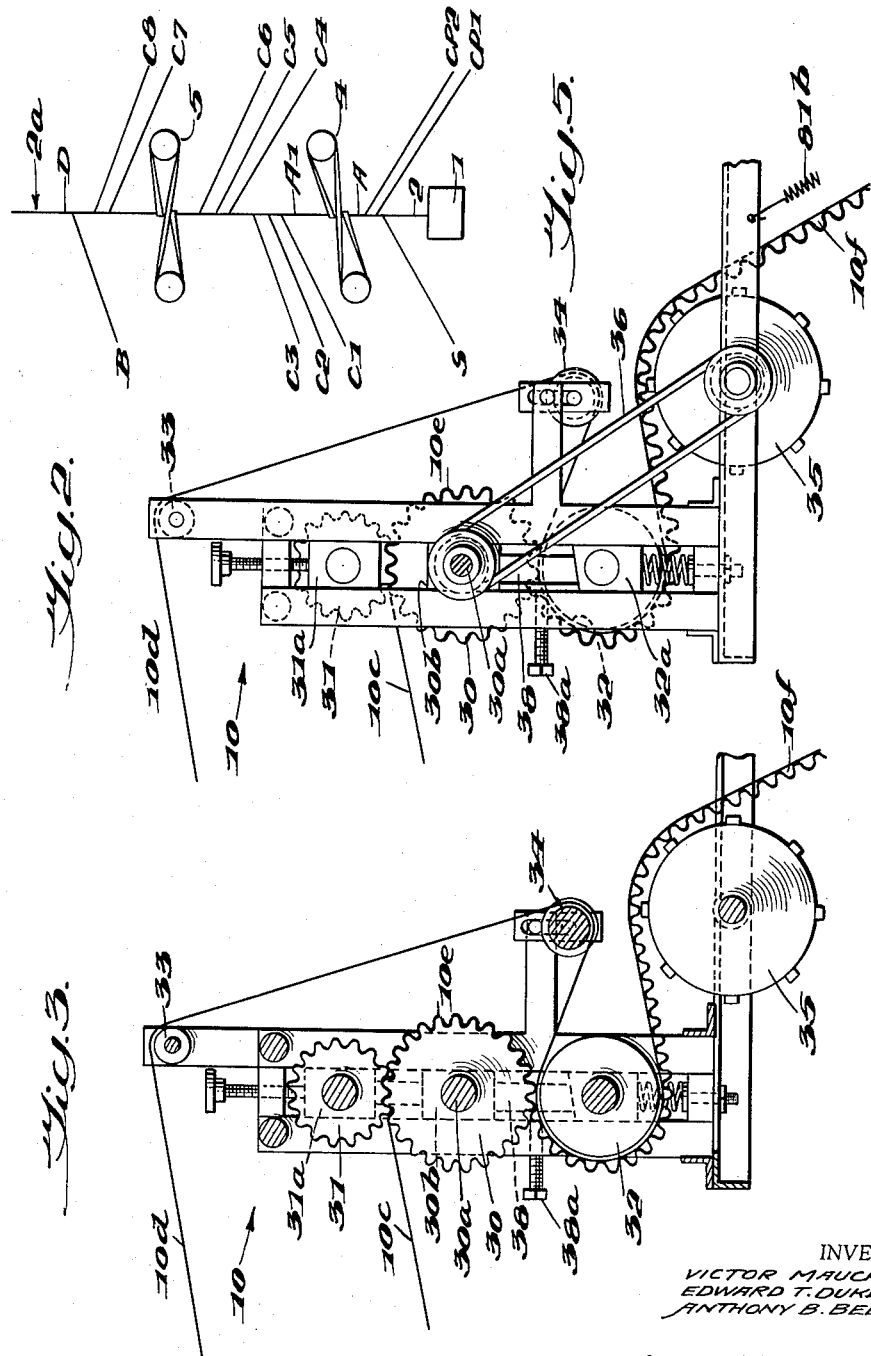

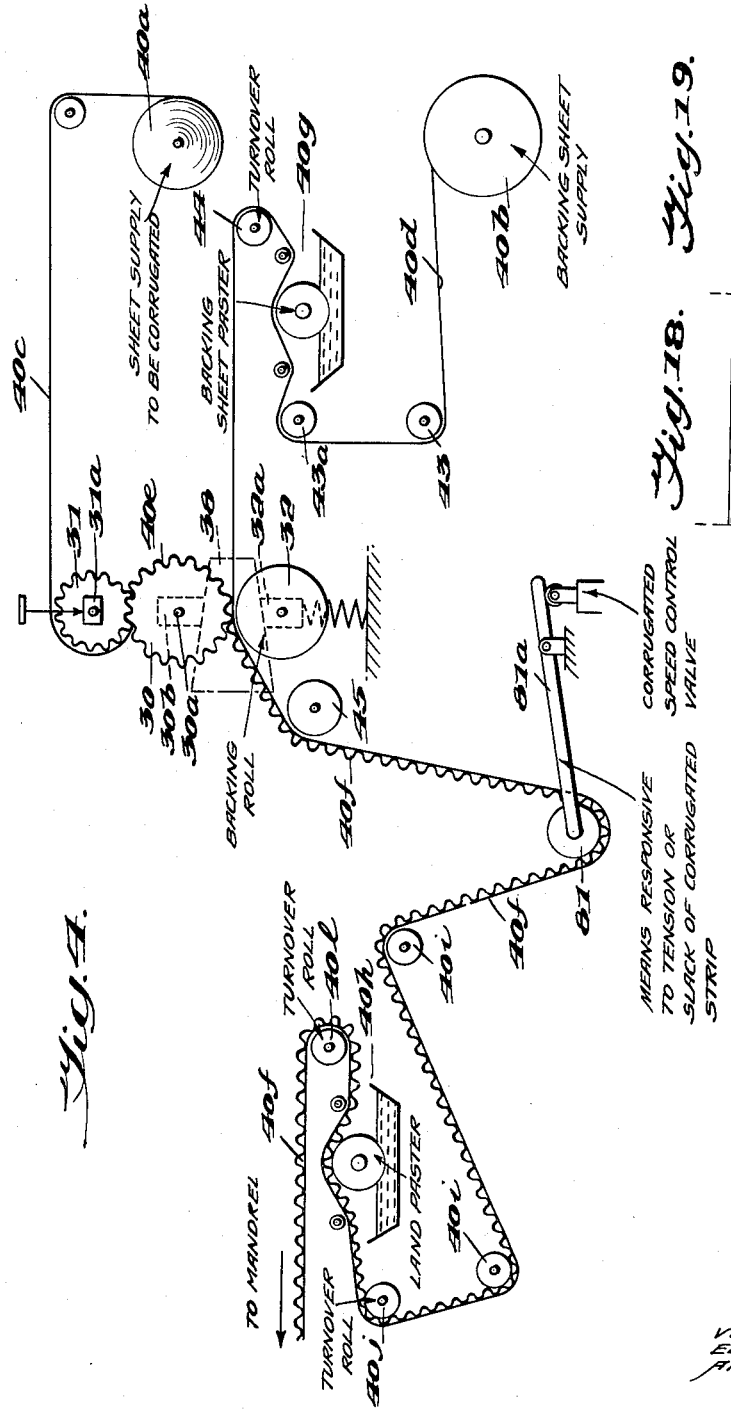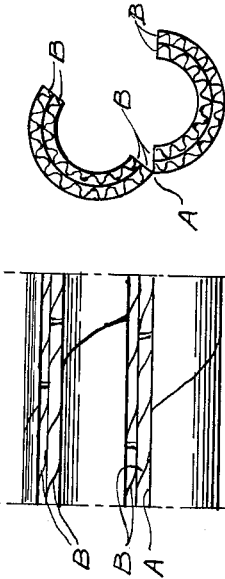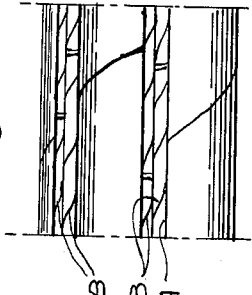

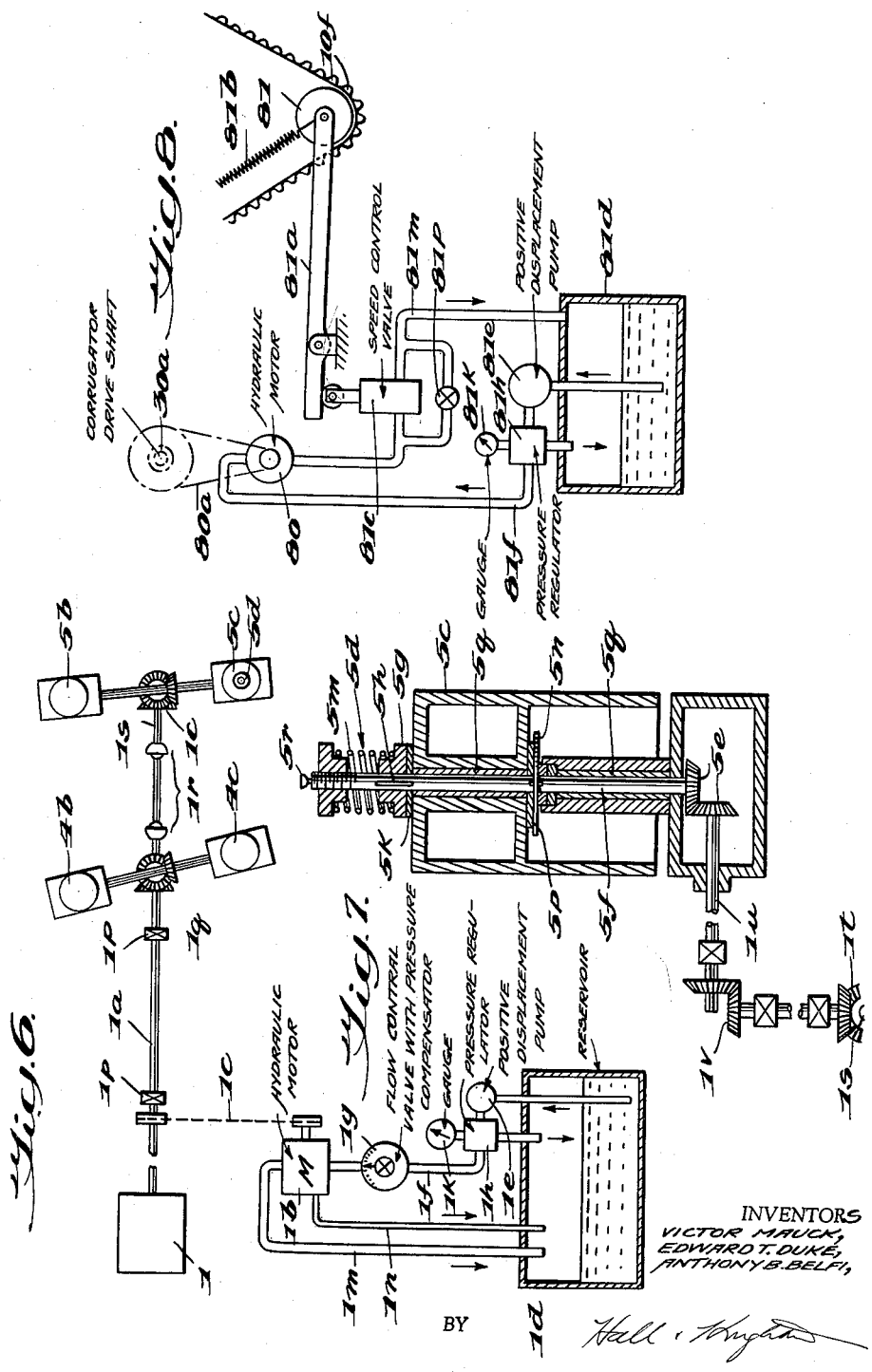

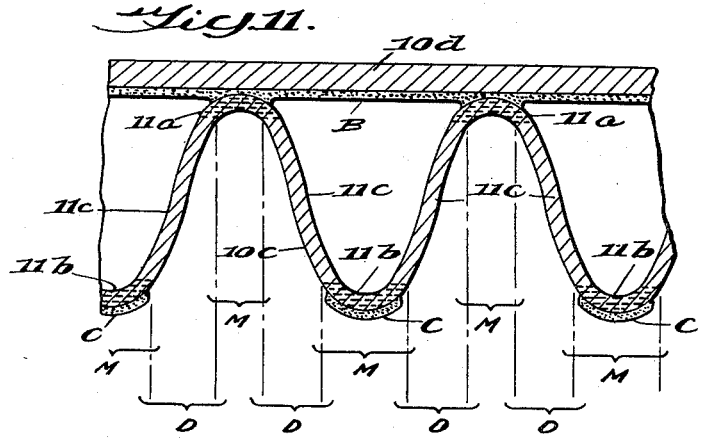
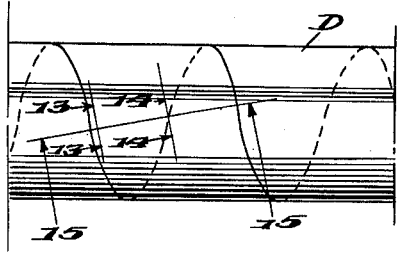
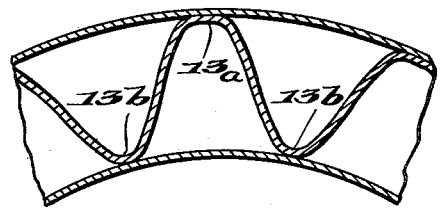
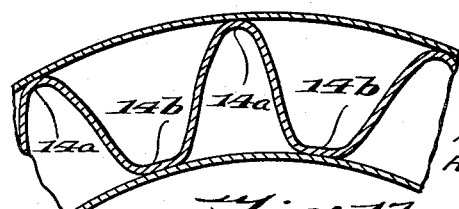
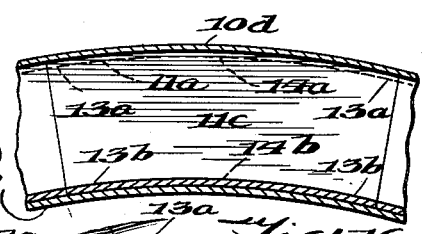
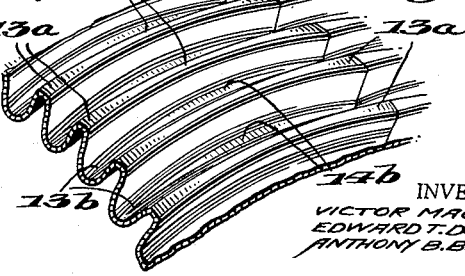
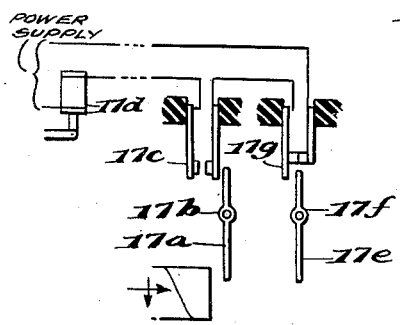
INVENTORS
VICTOR MAUCK,
EDWARD T. DUKE,
ANTHONY B. BELFI,
BY Hall & Houghton
ATTORNEY

2,978,373
HELICAL AIR CELL PIPE COVERING
Victor Mauck, Haverford Hotel, St. Petersburg, Fla.; Edward T. Duke, R.D. Box 7, Green Lane, Pa.; and Anthony B. Belfi, 614 Yole Road, Cynwyd, Pa.
Original application Oct. 26, 1956, Ser. No. 621,977. Divided and this application May 23, 1957, Ser. No. 665,879

10 Claims. (Cl. 154—45)

This invention relates to helically wound air cell pipe covering and aims to provide an improved product of this type and a novel method and apparatus particularly, but not exclusively, adapted for the production thereof. The method aspects of the invention are claimed in our original application Ser. No. 404,322, filed Jan. 15, 1954 (now Patent No. 2,778,840), and the apparatus aspects of the invention are claimed in our copending divisional application Ser. No. 621,977, of which the present application is in turn a division.

When an attempt is made to helically wind into a tube a strip of backed corrugated paper-board of asbestos or other material, with the corrugation thereof extending at an angle to the longitudinal axis of the tube, the inherent resistance of such corrugated material to bending in any direction other than parallel to its corrugations is met with. This resistance causes the corrugations of the strip to remain substantially straight and rigid like a lead pencil laid in contact with a cylindrical surface but at an oblique angle to the longitudinal axis thereof. Hence the edges of the corrugated strip lie at a greater radial distance from the tube axis than the central portions thereof and cause difficulty in producing a butt joint and also cause the butt joint regions to form in effect a raised rib extending helically about the tube, with the longitudinal cross-sections of the wrapped corrugated material exhibiting concave, or sway-backed, surface configurations between such ribs. This effect is not only unsightly, but it also interferes with the obtaining of good bonding between layers.

The problem presented is well known to those skilled in the art and although some patentees have overlooked it in proposing to so helically wind backed corrugated strip material, others have made certain proposals in an effort to avoid or overcome the difficulty. Some of these, e.g. Amesbury, in U.S. Patent 1,051,660 of Jan. 28, 1913, and Muessman, in U.S. Patent 1,519,694 of Dec. 16, 1924, have proposed arranging the corrugations diagonally of the longitudinal axis of the backed corrugated strip or tape, to position them parallel to the longitudinal axis of the tube, thus to avoid the difficulty. But such proposals present additional difficulties: for every different width of corrugated tape wound on a given radius there is a different angle of helical lead, and for every different radius of winding with the same width strip there is a different angle of helical lead; thus to take advantage of these proposals it is necessary to provide a different width of strip, or a different angularity of corrugations, for every different radius on which the strip is to be wound, if even a close approximation to longitudinal alignment of the corrugations is to be obtained. Beyond this is the difficulty of corrugating the material at an angle, or of cutting diagonal strips from sheet material corrugated at right angles to its length and splicing the same; and as a result of the several difficulties such proposals have not been commercially successful.

Another mode of procedure proposed for attempting to cope with the problem is that disclosed by Cumfer, in U.S. Patent 2,224,810. This proposal attempts to destroy the resistance to bending of a corrugation along its length by breaking of the corrugation into short lengths as by knife or saw cuts or the like through its exposed lands and web portions in much the same manner in which carpenters kerf the back side of a stiff panel so it may be bent around a corner. But the added procedure is expensive and in addition partially destroys the strength of the corrugations, rendering the product less resistant to crushing for a given weight of material.

As a result of the shortcomings of the prior proposals for solving the problem of helical winding of corrugated strip material, the continuous production of air cell pipe covering by the helical winding of a corrugated strip has never become conventional in the art, and the conventional mode of producing air cell pipe coverings of corrugated sheet material still consists in the convolute spiral winding of short sheets of corrugated material, one at a time, typical examples of which are shown in the expired patents to Clarke, 1,704,174 of March 5, 1929, and Deakin, 2,051,076, of Aug. 18, 1936, and in the patent of Fischer, 2,235,630 of March 18, 1941. These methods are not only inherently slow, but they either do not produce truly cylindrical pipe coverings, or crush flat the corrugations at the end portions of the sheets in an effort to produce a more nearly cylindrical product, thereby reducing the insulating efficiency and increasing the weight and cost of the product. Moreover they do not offer any opportunity for the use of narrow edge trimmings resulting from the trimming to standard size of the asbestos or other paper sheet made by the paper-making machine, and hence do not have the economic advantage of utilizing otherwise non-salable material.

The present invention aims generally to overcome the disadvantage of present and previously proposed practices in this field, and has among its objects, severally and interdependently, the production of a better, cheaper and lighter, air cell, insulating, pipe covering than that produced by methods heretofore deemed practical by those skilled in the art; the production of a helically wound air cell tubular pipe covering from corrugated tapes or strips having their corrugations positioned at an oblique angle to the longitudinal axis of the tube and substantially intact, but nevertheless of substantially true cylindrical shape; the production of corrugated asbestos air cell pipe covering comprising less adhesive than that now produced by commercially conventional methods, and hence lighter and cheaper, but without any substantial sacrifice in strength; the provision of new method steps and combinations thereof to provide a feasible and commercially practical method for the continuous production of such tubing, some of which steps and combinations are also feasible for other purposes as well; and the provision of new elements and combinations of apparatus particularly, but not exclusively, adapted for the practice of the method and the production of the new product.

Other and more detailed objects and advantages of the invention will be evident from the following detailed description of illustrative embodiments of the several aspects of the invention.

The invention resides in the novel product, and in the novel features and combinations of the method and apparatus devised for its production, as herein described, and is more particularly defined in the appended claims.

In the accompanying drawings of illustrative embodiments of the invention,

Fig. 1 is a diagrammatic plan view showing the new arrangement of apparatus to carry out the new process and produce the new product.

Fig. 2 is a side elevation of a corrugator particularly adapted for employment in the arrangement of Fig. 1.

Fig. 3 is a vertical section through the corrugator of Fig. 2.

Fig. 4 is a diagram illustrating the arrangement for producing and feeding corrugated strip, corrugated side up, to the tube winding machine of Fig. 1.

Fig. 5 is a diagram in plan illustrating a number of ways the various plies may be fed to the tube winding machine.

Fig. 6 is a diagram of the winding head drive of the winding machine coupled with a diagram of the adjustable speed hydraulic drive employed.

Fig. 7 is a vertical section through the driven roll of the secondary winding head of the winding machine, with the driving shafts and gears therefor in elevation.

Fig. 8 is a diagram of the variable speed hydraulic drive employed for each of the corrugators and of the means for automatically adjusting the corrugator speed to that of the winding machine.

Fig. 9 is a detail in longitudinal elevation of a part of the receiving and take away conveyor of Fig. 1.

Fig. 10 is a detail in longitudinal section thereof.

Fig. 11 is an exaggerated detail of the backed corrugated strip traveling from the corrugator and land paster to the winding head.

Fig. 12 is an elevation view of a portion of the new product.

Fig. 13 is a diagrammatic sectional detail taken on the line 13—13 of Fig. 12 adjacent an edge of a corrugated strip.

Fig. 14 is a similar detail taken on the line 14—14 of Fig. 12 adjacent the center line of the strip.

Fig. 15 is a similar detail taken on the line 15—15 of Fig. 12 parallel to the length of a corrugation.

Fig. 16 is a detail showing the alteration in the shapes of the adhesive moistened land portions of the corrugated strip, to the substantial exclusion of any collapse of the web portions thereof, effected by the method and apparatus exemplified in Fig. 1.

Fig. 17 is a diagram illustrating suitable controls for actuating the cut-off saw.

Figs. 18 and 19 are more or less diagrammatic side and end elevations of a longitudinally split product of the invention.

In the embodiment exemplified in Fig. 1, there is provided a tube winding machine comprising a support 1, a stationary hollow cylindrical mandrel 2 extending therefrom to about the point 2a and tapering thereto-ward, and a more or less conventional or core-winding head 4 comprising a winding belt 4a trained about pulleys or drums 4b and 4c with one of its runs looped helically about the mandrel 2, the drums 4b and 4c being laterally movable as shown to enable tensioning of the belt 4a and one of the drums, herein the drum 4c, being driven by suitable gearing hereinafter described in connection with Figs. 6 and 7.

In spaced relation to the core winding head 4 the winding machine is provided with a secondary, or corrugated-ply winding head 5, comprising a similar belt 5a trained on laterally movable pulleys 5b and 5c, one of which, the pulley 5c in the form shown, is driven by suitable gearing further described in connection with Figs. 6 and 7, through a friction clutch means 5d. The drive gearing and circumference of the pulley 5c are preferably so related to those of head 4 that during the winding of the plies wrapped on the tube by head 5 the friction clutch 5d is subjected to continuous slip as and for the purpose hereinafter described.

Spaced a substantial distance from the end of the mandrel at 2a is a take away conveyor means 6, adapted to receive the rotating tubing as it is delivered from the mandrel. Between the end of the mandrel at 2a and the conveyor 6 there is located traveling cut-off means 7 shown as a cut-off saw adapted to swing through the rotating tubing and simultaneously move longitudinally therewith to cut a section of predetermined length therefrom, and to then retract out of the path of the tubing and move back toward the location 2a ready to cut the next measured section therefrom.

Referring to Figs. 1, 6 and 7 the drums 4c and 5c of winding heads 4 and 5 are driven from the main drive shaft 1a of the winding machine. This main shaft 1a, in the form shown in Fig. 6, is driven at adjustable speed by hydraulic motor means 1b that is preferably connected to drive shaft 1a by a chain and sprocket drive 1c. The hydraulic motor 1b is supplied with fluid drawn from a reservoir 1d by a suitable positive displacement pump 1e from which it is supplied to pressure line 1f that leads through a manual control valve 1g to the motor 1b. The pressure line 1f in the form shown is provided with a suitable relief valve 1h discharging back into the reservoir 1d, and with a suitable pressure gauge 1k, and the control valve 1g is conveniently a standard flow control valve with pressure compensator, by which the flow may be regulated to impart any desired speed to the hydraulic motor within the capacity of the pump 1e. The motor 1b discharges back to the reservoir 1d through return line 1m, and any leakage through the motor packings is returned to the reservoir through a suitable bleeder line 1n. By this arrangement the operator may control the speed of the motor 1b to impart any desired speed to the winding machine main shaft 1a.

The main drive shaft 1a is supported in suitable bearings 1p and carries a bevel gear 1q coupled for driving the drum 4c as hereinafter described. Beyond the gear 1q the drive shaft 1a is coupled through a universal connection 1r to a secondary drive shaft 1s for driving the drum 5c of the winding head 5.

As shown in more detail in Fig. 7, the secondary drive shaft 1s drives the drum 5c through bevel gearing 1t coupling it to a vertical shaft, that is coupled to a splined or extensible shaft 1u by bevel gearing 1v, in turn coupled to the drum 5c by bevel gearing 5e and vertical drum shaft 5f, to which the driving element 5g of the friction clutch is splined at 5h. The driving element 5g bears on the drum 5c through a friction disc 5k of clutch lining or the like under the adjustable pressure of a spring 5m, and the shaft 5f also carries another disc 5n with clutch lining 5p bearing on the under side of the drum 5c thus affording an adjustable friction drive for the drum 5c. Suitable bearings 5q and lubricating provisions 5r are provided.

The drum 4c (Figs. 1 and 6) is driven from the bevel gear 1q through similar means except that the shaft corresponding to the shaft 5f is locked directly to drum 4c and not friction coupled thereto.

As above noted, the ratio of the driving gears, and the relative diameter of the drums 4c and 5c are such that the driving plate 5g of clutch 5d has an angular velocity that exceeds that permitted to the drum by the rate of rotation of the tubing established by the drum 4c and belt 4a, notwithstanding the increased diameter of the tubing by the addition of plies thereto between the two driving heads 4 and 5 (Fig. 1). Thus while the clutch 5d slips continually during the production of the tubing, it exerts a frictional traction that attempts to rotate and advance the tubing at a more rapid rate than that permitted by the drum 4c thus tending to tighten the helices. The portion of the tubing A between the two winding heads is thus put under circumferential and longitudinal tension regulated by the spring 5m (Fig. 7), this tension being applied through the plies newly added through the secondary winding head, and this novel provision, and the employment of a stationary mandrel, insures against buckling of the tube between the winding heads and aids in carrying out the new method of applying the corrugated plies to the core.

As shown in Fig. 1, the hollow mandrel 2 is preferably provided with electrical heating means energized through leads 2b brought out through the supported end of the mandrel.

In the arrangement shown in Fig. 1, the apparatus includes a slip sheet supply reel 8 from which a slip sheet strip or tape 8a is drawn, passed in contact with a block of wax soap or the like 8b, and wrapped around the mandrel 2, waxed side inwardly, to pass through the primary winding belt 4a. Also in the form shown, two or more reels 9 of core tape are provided, that deliver plain flat tapes 9a of asbestos or other paper to a paster 9b that moistens one side of each core tape with an adhesive such as sodium silicate solution. The tapes 9a after passing through the paster 9b are passed through the mandrel, with their adhesively coated faces inwardly directed, and are wrapped about the slip sheet strip 8a by the primary winding head to form the core tube A. The heating of the mandrel causes the wax carried by the slip sheet to act as a lubricant for the mandrel allowing the core A to rotate freely thereon, and also drives the moisture from the core strips 9a outwardly producing a partial set of the adhesive in the core A.

Still referring to Fig. 1, the apparatus therein shown further comprises a separate corrugator 10 for continuously supplying each strip of backed corrugated material to the winder, and preferably of the type described more fully hereinafter in connection with Fig. 2 and Fig. 3. Each corrugator 10 is fed from a reel 10a and a reel 10b with a strip or tape 10c of asbestos or other paper to be corrugated and with a similar strip 10d for backing the corrugated strip. As indicated in Fig. 1 several corrugators 10 may be carried by a single frame, but each corrugator unit 10 is separately driven by variable speed driving means hereinafter described in connection with Fig. 8, under a separate speed controller 81.

Turning now to Figs. 2 and 3, each dry strip 10c of asbestos paper or the like to be corrugated passes toward the winder between a main corrugating roll 30 and an auxiliary corrugating roll 31 and becomes a corrugated dry strip 10e, which is carried around by the corrugating roll 30 and passes between it and the smooth cylindrical backing roll 32. Each backing tape 10d (Fig. 1) passes through a paster 10g (Fig. 1) that moistens its under side with a suitable adhesive, such as sodium silicate solution. The adhesive moistened tape 10d then passes over turnover rolls 33 and 34 (Figs. 2 and 3) and enters between the corrugated tape 10e and the backing roll 32h, travelling away from the winder with its adhesively coated side facing the adjacent lands of the corrugated strip 10e, to which it adheres forming the composite backed corrugated strip 10f, which passes about the backing roll 32 and is delivered toward the winder over a delivering roll 35 that is driven from the corrugating roll by the driving belt 36. Each corrugator 10 is in turn driven by a separate variable speed drive, shown in Fig. 8 as a variable speed hydraulic motor 80 connected with the shaft 30a by a V-belt drive 80a.

Still referring to Figs. 2 and 3, the corrugator therein, as is preferred, embodies two other novel features contributing materially in providing a successful apparatus for the continuous process. In the first place, the bearing blocks 32a for the backing rolls 32 are spring-urged toward the fixed bearing blocks 30f of the corrugating roll 30 and the minimum clearance between these rolls is adjusted by wedge block 38 and adjusting screw 38a. The bearing blocks 31a of the auxiliary corrugating roll may be similarly mounted if desired. This provision is highly useful and automatically accommodates irregularities in the stock, and the extra thickness where the leading end of a new roll of tape is joined as by lapping and pasting to the trailing end of a nearly used roll to afford a continuous strip. In addition, at least the bearing blocks 30b for the main corrugating roll, are preferably provided, not with the usual bushing or friction bearings, but with antifriction bearings advantageously of the needle-bearing type. These provisions, which are not required in ordinary corrugators, are of peculiar utility in the present invention in which the composite tape 10f, while still moist, is placed under some tension and fed to the secondary winding head, as they prevent jumping of the tape apt to cause breakage thereof in its partially moistened condition.

Turning now to Figs. 2 and 8, each composite strip 10f delivered from the corrugator delivery roll 35 passes downwardly and then upwardly about a tension controlling means comprising a roller 81, that is carried by a power multiplying lever 81a, with part of its weight counterbalanced, as by the spring 81b. The lever 81a is pivoted on a suitable support, and as the roll 81 is raised, by the secondary winding head 5 (Fig. 1) drawing composite web 10f from the loop more rapidly than it is supplied thereto by the corrugator, the lever 81a increases the opening of the speed control valve 82, thus increasing the rate of driving of the corrugator shaft 30a by the hydraulic motor, and vice versa. The arrangement is preferably such that when the winding head 5 is stopped, a relatively short drop of the loop and roll 81 suffices to automatically stop the corrugator as well, and when the winding machine is restarted, a relatively short range of rise of the loop is sufficient to adjust the speed of the corrugator progressively to match any obtainable winder speed. As each corrugator is provided with a similar tension loop control, by this arrangement adjustment of the single control 1g (Fig. 6) by the operator serves to produce any desired change of speed of the tube winder and the corrugators automatically adjust their outputs to match the changed speed of the winder.

It will be noted that the corrugators 10 in Fig. 1, detailed in Figs. 2 and 3, deliver the composite backed corrugated strip 10f with its unbacked or open side downwardly positioned, and that in the arrangement shown in Fig. 1 these strips 10f are fed to the top side of the core A with the downwardly facing open lands of the first strip bearing on the core A, and with these of subsequently supplied strips each similarly bearing on the backing strip of the previously supplied strip A'.

Now ordinarily, when a corrugated strip is to be adhesively secured to sheets on each side of it, the practice is to apply adhesive, such as sodium silicate solution, to both sides of the strip to be corrugated, so that after corrugation it will adhere on both sides to the adjacent plain sheet. Such practice is avoided in the present invention, however, for several purposes that will be described more fully in connection with Figs. 11–17. Instead, as above described, it is the backing strip or tape that is pasted in forming the composite corrugated strip 10f, and as such strip is being passed to the winding head 5 (Fig. 1) the open lands only of the corrugated side of the strip 10f are moistened with adhesive, such as sodium silicate solution, by a paster herein termed a land paster 30h (similar to the paster 40h in Fig. 4) over which the strip 10f passes on its way from the tension loop to the winding head 5. Thus the backing strip and the lands of the corrugated strip facing the same are moistened and softened by the adhesive solution from paster 10g, and the open lands of the strip 10f are moistened and softened by the adhesive solution applied by the land paster 30h, and the composite tape is applied to the tube A (or A') by the winding head 5 while these conditions pertain and while the web portions of the corrugated strip 10e that have not been moistened by application of adhesive solution to them, remain relatively dry and stiff. A binder sheet or strip 20 of any desired surface characteristic, may be applied preferably between the winding head 5 and the end of the mandrel at 2a, with either flush joints or lapped joints, depending on whether it is of the same or greater width than the underlying strips, such strips being supplied through a paster at either side of the machine.

The corrugator and paster arrangement 10, 30h thus far described delivers the backed corrugated strip 10f open face down, as noted, and in some instances, when not too many corrugated plies are being applied to the tube A, such arrangements are all that are needed. But on occasion, as where a larger number of plies is being supplied to the winding head 5, or where other special requirements necessitate, one or more composite strips may be fed from the other side of the machine, corrugated side up, to the under side of the tube being formed, as indicated at 40f, Fig. 1. In such case a different arrangement of the corrugating and pasting equipment is required that will now be described in connection with Fig. 4.

In Fig. 4, the dry sheet or strip to be corrugated, 40c, is supplied from a reel or roll 40a, and the backing strip 40d from a similar reel or roll 40b. In this case, however, the strip 40c is carried around the auxiliary corrugating roll 31 and travels backwardly away from the winding machine as it passes between it and the main corrugating roll 30. The corrugated dry strip 40e then travels forwardly toward the winding machine as it passes between the corrugating roll 30 and the backing roll 32, the arrangement of the corrugator otherwise being the same as in Figs. 2 and 3.

The backing sheet or strip in this instance passes, for convenience, over turnover rolls 43, 43a before passing over the paster 40g in a direction leading away from the winder, and then over a turnover roll 44 to present its pasted side uppermost as it passes over the backing roll 32 toward the winder. The composite strip 40f passes over a driven delivery roll 45 (similar to roll 35, Figs. 2 and 3) and forms a tension loop about the associated tension roller 81 as before, after which it passes over idler rolls 40i and turnover roll 40j and travels away from the winder as its open lands are moistened by the paster 40h. The composite strip with its backing strip and open lands pasted, is then passed over another turnover roll 40l from which it travels to the underside of the tube being formed, as shown in Fig. 1.

As shown in Fig. 8, each of the corrugators is driven by a separate hydraulic motor 80 under control of the speed control valve 82. As shown in Fig. 8, the hydraulic motor 80 is supplied with pressure fluid by a positive displacement pump means 81e through a pressure line 81f provided with a by-pass valve 81h and a gauge, that may be similar to the corresponding parts in Fig. 7. In the form shown in Fig. 8, however, the pressure line 81f is connected directly to the hydraulic motor 80, and the automatic speed control valve 81c is connected in the return line 81m, a manual valve 81p being provided in parallel with the valve 81c to facilitate running of the corrugator for threading up at the commencement of an operation, and for cleaning out at the conclusion of a work period. Bleeders, like 1n in Fig. 6, may also be provided.

Reference is now made to Figs. 11–17 illustrating how the present invention produces a substantially truly cylindrical pipe covering despite the fact that the corrugations therein are disposed at an oblique angle to the longitudinal axis of the tubing. As above described and shown in Fig. 11 to an enlarged scale, the adhesive solution B preferably of sodium silicate, that is applied to the backing strip 10d (or 41d) of asbestos paper or like somewhat absorbent material by the paster 10g (or 40g) moistens that sheet as indicated by the broken line convention, and when brought into contact with the adjacent land portions 11a of the corrugated dry somewhat absorbent strip 10c by the backing roll 32 also transmits moisture thereto as similarly indicated. The backing sheet 10d and the adjacent land portions 11a are thus rendered moist and somewhat softened. The subsequent application of the adhesive solution C by the paster 30h (or 40h) to the open or unbacked land portions 11b of the corrugated strip 10c similarly moistens and softens these land portions. However, the web portions 11c of the corrugated strip 10c to which no adhesive is directly or indirectly applied, remain relatively dry and stiff compared to the land portions 11a and 11b.

The composite strip or strips in the differentially moistened condition illustrated in Fig. 11 are then wound, by the winding belt 5a adjusted to proper tension, one on the underlying cylindrical core A (Figs. 1 and 15) and the others on the backing sheets A' of the respective underlying ply (Fig. 15). Under these circumstances the softened open lands 11b (Fig. 11) are easily flattened and widened to a considerable degree near the longitudinal center line of the strip as indicated at 14b (Figs. 14, 15 and 17) the flattening and widening tapering off toward the edges of the strip as shown at 13b (Figs. 13, 15 and 17). At the same time, the softened backed lands 11a (Fig. 11) undergo a somewhat similar flattening, but in this case it is the portions of the lands 11a near the edges of the strip that flatten and widen the most, as shown at 13a (Figs. 13, 15 and 17) the flattening and widening tapering off toward the center line of the strip, as shown at 14a (Figs. 14, 15 and 17). And as the backing sheets 10d or A' (Figs. 11 and 15) are also relatively moist and soft, they follow the curvature thus imparted to the covered lands 13a, 14a, along line 15—15, Fig. 12 (see Fig. 15), and thus are brought into conformance with what to the eye, appears to be a substantially true cylindrical contour, as indicated at D in Fig. 12. But since the web portions 11c (Fig. 11) of the corrugated strip are relatively dry and stiff, they resist deformation and collapse to a greater extent than do the moistened parts of the composite strip and thus, the tension of the belt 5a being properly adjusted, maintain the composite strip against collapse, and impart sufficient strength to it to transmit to the core A the tractive force derived from the friction drive 5d (Figs. 1 and 7).

As above noted, by the time the core A reaches the secondary winding head 5 (Fig. 1) it has been substantially heated and stiffened by the heat from the mandrel 2, the tractive force exerted on it between the two heads having also pulled its several helical tapes or strips down tightly together about the mandrel. Thus although the plies wrapped about the core are relatively soft and moist the formed tube has sufficient stiffness to support itself cantilever fashion over the intervening space between the end of the mandrel and the beginning of the conveyor 6 (Fig. 1). Furthermore, additional heat is supplied from the mandrel up to the point 2a, tending to drive the moisture toward the outside of the tube and further stiffens its core. Due to these factors, as the tube leaves the mandrel, it is in a state in which it can be severed into measured lengths by the traveling cut-off saw 7, provided that saw is one capable of cutting material still wet with adhesive, and more particularly sodium silicate adhesive, without undue gumming. Such a cut-off saw that eliminates completely the problem of gumming, has been developed by Edward T. Duke, one of the co-inventors of the present improvements, and is more fully described in his copending sole application, Ser. No. 426,183, filed April 28, 1954, now Patent No. 2,855,669.

The cut-off saw carriage and actuating mechanism are preferably of a conventional type such as that manufactured by A. B. Belfi Co., of Philadelphia, Pa., and forms no part of the present invention.

In the Belfi cut-off saw a weight pulls the saw carriage lengthwise and a vacuum line is opened at the end of the saw travel to throw the saw back to its starting position, where it latches until released by a solenoid to again enter, and move lengthwise with, the stock being cut. To adapt such mechanism to the present process a dual switch device has been developed associated with the solenoid. In this device, as shown in Fig. 17, there is provided in the path of the leading end of the tube D advancing from the mandrel a first trip lever 17a, spaced from the entering plane of the saw by a distance corresponding to the length of tube to be cut. The lever 17a is arranged to be tilted by the tube about a pivot point 17b and closes a pair of contacts 17c when raised by the tube. The closing of the contacts 17c completes the circuit to the releasing solenoid 17d of the cut-off saw mechanism, starting the saw into the work at the proper point. As the saw completes its cut and is returned to its starting position in a distance much shorter than the tube length being cut, there is provided a short distance beyond the lever 17a a second lever 17e pivoted at 17f that opens a pair of normally closed contacts 17g connected in series with the contacts 17c. Thus just after the saw has been released by the circuit maker 17a–17c, the circuit breaker 17e–17g opens the circuit, so that the saw latch will be in condition to retain the saw against operation until the next section of tubing to be cut is measured.

Since the take-away conveyor is operated at a speed greater than the rate of advance of the tube D from the mandrel, as soon as a section is cut by the saw it begins to advance away from the remainder of the tube advancing from the mandrel, with the result that the severed portion passes out from under the lever 17a and opens the circuit maker contacts 17c, and then passes out from under the lever 17e and closes the circuit breaker contacts 17g without that section of tubing ever closing the solenoid circuit again, but leaving the elements in the relationship illustrated in Fig. 17 so that the solenoid circuit will again be closed when lever 17a is raised by the next measured length of tubing.

As above mentioned the take-away conveyor 6 is driven at a faster rate than that at which the tube is fed from the mandrel. In practice a rate 25% faster has been found satisfactory. Such a rate may be selected manually, or it may be maintained if desired, irrespective of variations in the speed of the winder, in any suitable way, for example, by driving the conveyor 6, with proper gear ratio, from some convenient portion of the driving assembly connecting the motor 1b (Fig. 6) with the winding heads, for example, from the motor shaft, from chain 1c, or from the shafts 1a or 1s.

The take-away conveyor may be of any suitable form, but a particularly simple and satisfactory form is shown in Figs. 1, 9 and 10. In this form, the conveyor comprises a belt 91 trained about two pulleys 92 and 93, one of which is power driven. The upper run of the belt 91a which moves away from the mandrel 2 is held level by an underlying shelf or plate 93, preferably having down turned ends 93a. Attached to the belt at intervals of about every six inches or so along its lengths are transverse frames 94 supporting rollers 95 freely rotatable on longitudinally extending axles, these rollers being similar to conventional roller-skate wheels, preferably of the ball-bearing type, and preferably with rounded edges like those of conventional roller-skate wheels. The conveyor being mounted with its upper run about level with the lower surface of the tubing D being delivered from the mandrel, as the tubing advances, the rollers 95 rising about the pulley 93 contact the lower surfaces of the leading end of the tubing D and gently raise it, if it is sagging slightly, to alignment with the bed afforded by the rollers 95 on the upper run 91a of the belt, as illustrated in Fig. 10, the free rotation of the rollers allowing the tube D to rotate without hindrance. As more than half of the measured length of tubing to be cut is rolling in the bed thus afforded before the cut-off saw severs the section from the tube, there is no tendency of the cut section to tip backward off the conveyor. The cut sections may be removed from the conveyor manually or by any suitable mechanical means and are then preferably laid out straight on a level surface to dry and stiffen.

It has been noted that while the heated core of the tube is somewhat dried and stiffened, when inorganic adhesive such as sodium silicate solution is employed, the balance of the tube contains considerable moist adhesive, and moisture driven from the core area by the heating thereof, when it is cut into sections. This is important in the case especially of inorganic adhesives such as sodium silicate, in which too rapid a set of the adhesive produces an inferior product as regards strength, heat resistance, etc. When the severed sections of the tube are laid out to dry and stiffen, the moisture redistributes itself fairly evenly throughout the tube structure and the tubing seasons and dries slowly developing the full strength of the adhesive.

As illustrated in Figs. 18 and 19, the tubes thus formed may, when desired, be split lengthwise in any suitable way, preferably with the binder strip and the adjacent backing strip left intact at one side of the tube or with other provisions to provide a hinge A for the split unit. Such provisions per se are well known in connection with convolute wound pipe covering, and are described, for example, in Deakin's U.S. Patent No. 2,051,076, issued August 18, 1936, and form no part of the present invention. However, the application of such provisions to the spirally wound tube of the present invention in which the lands of the corrugations are continuous although conformed to a cylindrical surface, produces a reinforcing of the cut edge that is not obtained when splitting is applied to a tube in which it runs parallel to the corrugations, as in the convolute wound tubes of the Deakin type. This is so, because in the structure of the present invention the corrugations run obliquely and therefore are successively intersected by the longitudinal split so that portions of the adhesively secured lands and portions of the webs of each intersected corrugation appear at each of the cut edges of the split structure, as best illustrated at B in Figs. 18 and 19. Accordingly with this combination no extreme length of unsupported edge occurs that is likely to be easily broken or deformed during installation, with consequent detriment to the true cylindrical appearance of the installed pipe covering.

Turning now to Figs. 1 and 5, it will be appreciated that many different arrangements of the equipment may be employed for feeding plies of different material and number to the winder in the making of products of different sizes and of different numbers of plies. As indicated in Fig. 5, one slip sheet ply S is generally employed, and this ply is usually made up of a single strip of appropriate width. Only a few core plies, e.g. CP1 and CP2, are usually applied ahead of the first winding head 4 and these are generally fed to the winder from the same side of the machine over a common paster appropriately oriented (compare pasters 30h and 40h, Figs. 1 and 4). When these plies pass directly through the winders without addition of other plies thereto, we still prefer to employ the secondary winding head 5 to apply tightening traction to the helically wound tube as above described.

Usually not more than six corrugated plies are added between the two winding heads. When not more than three such plies are added they are usually supplied from the same side of the machine, as exemplified at C1–C3 or C4–C6 in Fig. 5, and at 10f in Fig. 1. When four plies are thus added two are usually supplied from each side of the machine, etc. When more than six plies are employed, the additional plies are usually supplied between the second winding head 5 and the end of the mandrel at 2a, as is the binder strip B when used.

As indicated by the arrowed arcs and at 10f in Fig. 1, and by the divergence of the lines C1–C3, C4–C6, and C7–C8 in Fig. 5, the helical pitches of the winding belts 4a and 5a and the angles at which strips of ply-forming material are supplied to the winding machine must be adjusted generally in accordance with the widths of the strips and the diameters on which they are wound. Furthermore, the angularity of each strip relative to the longitudinal axis of the mandrel changes the effective width of a given strip, measured longitudinally of the mandrel. Hence, for each ply to form a completely butted joint, the several plies would have to be slightly increased in actual width in the order of their application to the tube. The difference is very slight in the case of thin plies such as the slip sheet and the core plies CP1 and CP2, and the strips for such plies are usually cut of equal width and wind with closely butted joints. When corrugated strips of the same width as the strips CP1 and CP2 are employed, however, after the first ply the effective width of each ply, parallel to the longitudinal axis of the tube, is slightly lessened because the strip is supplied thereto at a less oblique angle (see Fig. 1). Thus, if a number of corrugated strips of equal width are used, the helical joint in the first ply will be nearly closed, that in the second will be slightly more open, and the gap between the edges of the helically wound strips increases from ply to ply. When only a few corrugated plies are being used, this gap is inconsequential and the plies are usually all cut to the same width, and the gap in the outermost ply is covered with the binder tape sheet 20 (Fig. 1).

Where a large number of corrugated plies is being added, several of the strips, say C1–C3, may be of one width, the next group, say C4–C6, may be, say one-fourth inch wider, and the final group, say C7 and/or C8, may be of still greater width to produce substantially closed joints at the exterior of the tube D. When the binder strip 20 is employed, it is usually formed of quite thin stock, and of a width to produce a lap joint, preferably a hair-lap joint, and it thus aids and does not detract from the purely cylindrical effect obtained.

As above indicated, since the tubes according to the invention are formed from relatively narrow continuous strips, and as strips of different widths can be used, such strips can be cut from the inner margins of the selvedge trimmed from the edges of the wide paper sheets, such as asbestos paper sheets, as delivered from the paper making machine. In such machines the paper is generally made with considerable excess width, to provide for any unusual variation in selvedge contour, and hence a relatively wide selvedge trim is removed to reduce the sheet to standard width. Normally such trim has to be returned to the beaters for reprocessing through the machine, but large quantities of such selvedge trim material may be utilized for the purposes of the present invention without such reprocessing. Further economies of course are effected by the mode of pasting the backing ply, the pasters of course comprising the usual doctor blades, and by the mode of assembling the air cell tubing, which yield a product some 20% lighter than a convolute wound pipe covering of comparable size, and one which is a more efficient insulator.

While the machine, the core tensioning method, the hydraulic drive, the cut-off arrangement, the conveyor etc. are especially useful in combination with other steps and features with which they cooperate for the production of the new air cell tubing structure, particular elements and combinations of them, as noted, are also useful in other connections. For example, certain parts and features of the invention, such as the primary and secondary winding head sub-combination, are useful in the continuous formation of spiral tubing of plain asbestos tape, or of other materials of less strength than plain asbestos tape, such as creped asbestos tape, wool-felt tape, reinforced hair felt tape, glass fiber roving tape, felted glass fiber tape, polymerization setting adhesive impregnated glass fiber tape heated to initiate the set as applied or after winding, and such materials in combination with various core, intermediate, or finish plies of standard strength materials.

The hydraulic drives in combination with each other solve the very difficult problem of synchronization and other problems presented in the arrangement of Fig. 1, in a simple and efficient manner. Variable speed electrical drives can be synchronized only by expensive installations of electronic control equipment; variable speed belt drives such as the Reeves Variable Speed Pulley type of drive, are irregular and uncertain in operation. With the hydraulic drives, all minor variations in speed requirements are met at once, and the desired power can be applied to each fluid motor as required. Further, the use of constant pressure as maintained by the relief valve, combined with flow control by valves of the metering or tapered spindle type, reduces the entire problem of synchronization to a mere matter of controlling the flow to maintain constant tension. And with the new combination it becomes a simple matter to slow down the entire operation, without stopping, to make splices of any of the several ply materials as a roll thereof becomes exhausted. This ability is of great practical utility, as it eliminates waste through the production of short ends or through the continued winding of defective tubing, and saves the time of shutting off the equipment, and clearing and restarting on a bare mandrel, and eliminates the problem of maintaining the mandrel heat in the proper range under such conditions.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

We claim:

1. An air cell, insulating, pipe covering comprising a helically wound strip of corrugated material forming a tube and having its corrugations extending at an oblique angle to the longitudinal axis of the tube, the land portions only of the corrugations being continuous and uninterrupted throughout the width of the strip with the outwardly facing lands thereof progressively wider and flatter toward the edges of the strip than at the center of the strip, and with the inwardly facing lands thereof progressively wider and flatter toward the center of the strip than at the edge of the strip, whereby the obliquely positioned lands are in effect curved to conform substantially to the curvature of a cylindrical surface concentric to the axis of said tube.

2. An air cell, insulating, pipe covering comprising a substantially cylindrical hollow core and at least one strip of backed corrugated material wound helically thereabout to form a tube and having its corrugations continuous and uninterrupted throughout the width of said strip and extending at an oblique angle to the longitudinal axis of the tube, the backing of the corrugated strip being bent in the direction of helical winding and at right angles thereto, the outwardly facing lands only of the corrugations being progressively wider and flatter toward the edges of the strip than at the center of the strip and the inwardly facing lands only of the corrugations being progressively wider and flatter toward the center of the srtip than toward the edges of the strip, whereby the obliquely positioned lands are in effect curved to conform substantially to the curvatures of cylindrical surfaces concentric to said core.

3. An air cell, insulating, pipe covering comprising a substantially cylindrical hollow core and at least two strips of backed corrugated material wound helically thereabout to form a tube, each corrugated strip having its corrugations continuous and uninterrupted throughout the width of said strip and extending at an oblique angle to the longitudinal axis of the tube, the backing of each corrugated sheet being bent in the direction of helical winding and at right angles thereto to conform to a cylindrical surface substantially concentric to said cylindrical core and the outwardly facing lands only of the corrugations being progressively wider and flatter toward the edges of the strip than at the center of the strip and the inwardly facing lands only of the corrugations being progressively wider and flatter toward the center of the strip than toward the edges of the strip, whereby the obliquely positioned lands are in effect curved to conform substantially to the curvatures of cylindrical surfaces concentric to said core.

4. A light weight, air cell, insulating, pipe covering comprising a substantially cylindrical hollow core, and at least one strip of backed corrugated material wound helically thereabout to form a tube, said strip having the lands of its corrugations continuous and uninterrupted throughout the width of said strip and disposed at an angle to the longitudinal axis of the tube, the lands only of the corrugated material being adhesive coated, the outwardly facing lands only of the corrugations being progressively wider and flatter toward the edges of the strip than at the center of the strip and the inwardly facing lands only of the corrugations being progressively wider and flatter toward the center of the strip than toward the edges of the strip, whereby the obliquely positioned lands are in effect curved to conform substantially to the curvatures of cylindrical surfaces concentric to said core.

5. A light weight, air cell, insulating pipe covering comprising a substantially cylindrical hollow core, and at least one composite strip of backed corrugated material wound helically thereabout to form a tube, said strip having the lands of its corrugations continuous and uninterrupted throughout the width of said strip and disposed at an angle to the longitudinal axis of the tube, the corrugated side of each backed corrugated strip facing said core and bearing adhesive on its lands only, securing it to the underlying surface, the outwardly facing lands only of the corrugations being progressively wider and flatter toward the edges of the strip than at the center of the strip and the inwardly facing lands only of the corrugations being progressively wider and flatter toward the center of the strip than toward the edges of the strip, whereby the obliquely positioned lands are in effect curved to conform substantially to the curvatures of cylindrical surfaces concentric to said core, and the backing strip of the composite strip bearing adhesive securing it to the lands of the underlying corrugated strip, the web portions of the corrugated strip being substantially devoid of adhesive.

6. A light weight, air cell, insulating, pipe covering comprising a plurality of composite strips of backed corrugated material wound helically over each other, the backing strip of each composite strip bearing adhesive on one of its sides securing it to the lands on the adjacent side of its associated corrugated strip and the other side of each corrugated strip bearing adhesive on its land portions only, securing it to the other side of the backing strip of the next adjacent composite strip, the web portions of said corrugated strips being substantially free of adhesive, and each composite strip having the lands of its corrugations continuous and uninterrupted throughout the width of the composite strip and disposed at right angles to the length thereof, the outwardly facing lands only of the corrugations being progressively wider and flatter toward the edges of the strip than at the center of the strip and the inwardly facing lands only of the corrugations being progressively wider and flatter toward the center of the strip than toward the edges of the strip, whereby the obliquely positioned lands are in effect curved to conform substantially to the curvatures of cylindrical surfaces concentric to the axis of the pipe covering.

7. A light weight, air cell, insulating, pipe covering comprising at least two helically wound superposed core strips breaking joints with each other and adhesively secured together, and at least two composite strips of backed corrugated material wound helically in superimposed relation on said core with the backed sides thereof outwardly disposed, the backing strips bearing adhesive on their inner faces securing them to the outwardly facing lands of the corrugated strips, and the corrugated strips bearing adhesive on their inwardly facing lands securing them to the underlying material, the web portions of said corrugated strips being substantially free of adhesive, and each composite strip having the lands of its corrugations continuous and uninterrupted throughout the width of the composite strip and disposed at right angles to the length thereof, the outwardly facing lands only of the corrugations being progressively wider and flatter toward the edges of the strip than at the center of the strip and the inwardly facing lands only of the corrugations being progressively wider and flatter toward the center of the strip than toward the edges of the strip, whereby the obliquely positioned lands are in effect curved to conform substantially to the curvatures of cylindrical surfaces concentric to the axis of the pipe covering.

8. An air cell tubular pipe covering comprising at least two helically wound superposed core strips breaking joints with each other and adhesively secured together, at least one composite strip of backed corrugated material wound helically in superposed relation on said core with the backed side thereof outwardly disposed, the backing strip thereof being adhesively secured to the outwardly facing lands of the corrugated strip thereof, and the inwardly facing lands of the corrugated strip thereof bearing adhesive securing them to the underlying materials, the web portions of said corrugated strip being substantially free of adhesive, and each composite strip having the lands of its corrugations continuous and uninterrupted throughout the width of the composite strip and disposed at right angles to the length thereof, the outwardly facing lands only of the corrugations being progresisvely wider and flatter toward the edges of the strip than at the center of the strip and the inwardly facing lands only of the corrugations being progressively wider and flatter toward the center of the strip than toward the edges of the strip, whereby the obliquely positioned lands are in effect curved to conform substantially to the curvatures of cylindrical surfaces concentric to the axis of the pipe covering.

9. An air cell tubular pipe covering comprising at least two helically wound superposed core strips breaking joints with each other and adhesively secured together, at least one composite strip of backed corrugated material wound helically in superposed relation on said core with the backed side thereof outwardly disposed, the backing strip thereof being adhesively secured to the outwardly facing lands of the corrugated strip thereof, and the inwardly facing lands of the corrugated strip thereof bearing adhesive securing them to the underlying materials, the web portions of said corrugated strip being substantially free of adhesive, the lands of said corrugated strip being continuous from end to end and being disposed obliquely of the axial length of the tubing the outwardly facing lands only of the corrugations being progressively wider and flatter toward the edges of the strip than at the center of the strip and the inwardly facing lands only of the corrugations being progressively wider and flatter toward the center of the strip than toward the edges of the strip, whereby the obliquely positioned lands are in effect curved to conform substantially to the curvatures of cylindrical surfaces concentric to said core.

10. An air cell tubular pipe covering according to claim 9, said pipe covering also comprising at least one binder strip helically wound on the substantially cylindrical surface presented by said backing strip.

References Cited in the file of this patent

UNITED STATES PATENTS

| | | |
|---|---|---|
| 2,051,076 | Deakin | Aug. 18, 1936 |
| 2,209,311 | Karcher | July 30, 1940 |
| 2,224,810 | Cumfer | Dec. 10, 1940 |
| 2,423,870 | Blessing | July 15, 1947 |